Feb. 24, 1970     G. J. LISTNER ET AL     3,496,603
SINGLE SCREW EXTRUDER
Filed Aug. 17, 1967     2 Sheets-Sheet 1

INVENTORS:
GREGORY JULIUS LISTNER
ARTHUR JAMES SAMPSON
BY
ATTORNEY

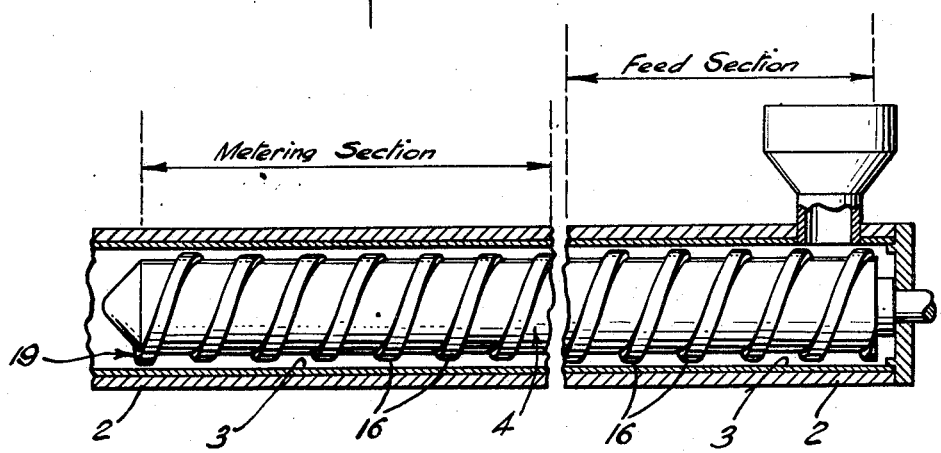
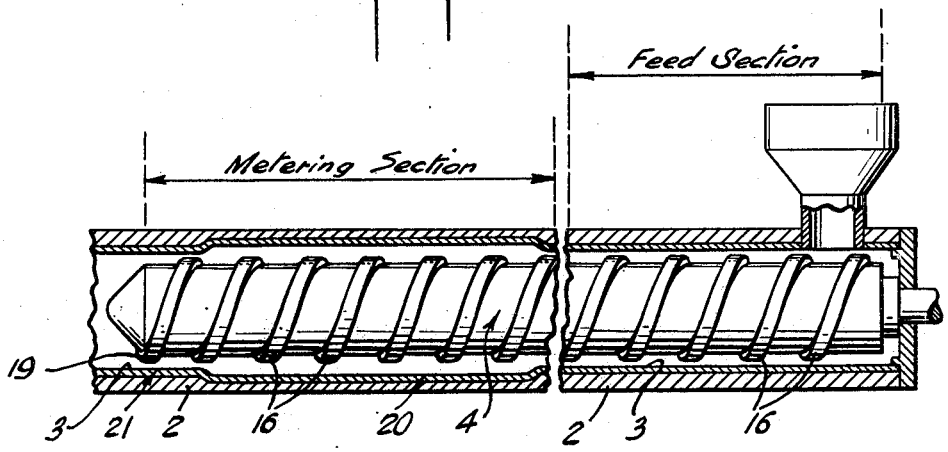

3,496,603
SINGLE SCREW EXTRUDER
Gregory Julius Listner, Kendall Park, and Arthur James Sampson, Cranbury, N.J., assignors to Johnson & Johnson, a corporation of New Jersey
Filed Aug. 17, 1967, Ser. No. 661,424
Int. Cl. B29f 3/02
U.S. Cl. 18—12     8 Claims

ABSTRACT OF THE DISCLOSURE

This invention is concerned with the improvement to a single screw extruder which is provided by increasing the clearance in the compression areas between the screw and the inner wall of the extruder barrel.

---

Thermoplastic material is heated and plasticized in an extruder and is extruded into a shaped article of manufacture such as a filament or a film. In this process, the screw forms the heart of the extruder since as resinous thermoplastic material is fed into the heated extruder, the screw conveys, mixes and plasticizes the heated thermoplastic material. Its flights force this material toward the die and scrape the molten plastic material from the inner surface of the extruder barrel or cylinder. The present invention is concerned with significantly reducing or eliminating high shear areas represented by tight clearances between the screw and the inner wall of the extruder barrel without reducing the feed rate of the screw.

The instant invention evidences these features in a single screw extruder consisting basically of a cylinder in which a screw extending substantially the entire length of the cylinder is rotated, by providing the improvement which comprises establishing a flight-hand clearance between the innear wall of the cylinder and the flights of the screw in the compression section, of at least 10% in excess of said clearance in the feed section of the screw while maintaining means to center the screw in the cylinder in that portion of the metering section nearest the terminus of the screw.

The "compression section" as used herein is the metering section and the transition section of the screw.

Preferably the improvement defining this invention is provided by establishing a flight-land clearance between the inner wall of the cylinder and the flight-lands of the screw in the metering section of at least 10% in excess of said clearance in the feed section of the screw. This arrangement provides optimum benefits.

The provision of the above-defined increased clearance in the compression section, significantly reduces damaging shears to the thermoplastic material undergoing extrusion, without significantly changing the feed rate of the screw.

This invention is particularly adapted for the processing of thermally sensitive polymeric materials and preferably polyolefinic materials such as polypropylene and polyethylene, etc.

Further advantages of this invention will become apparent from the following detailed description of several embodiments thereof taken in conjunction with the appended drawings of which:

FIG. 3 is an enlarged cross section, with a portion cut away, of the barrel and screw of a single screw extruder which has been constructed in accordance with one embodiment of this invention, and FIG. 4 is an enlarged cross section, with a portion cut away, of the barrel and screw of a single screw extruder which has been constructed in accordance with another embodiment of this invention.

Figure 1:
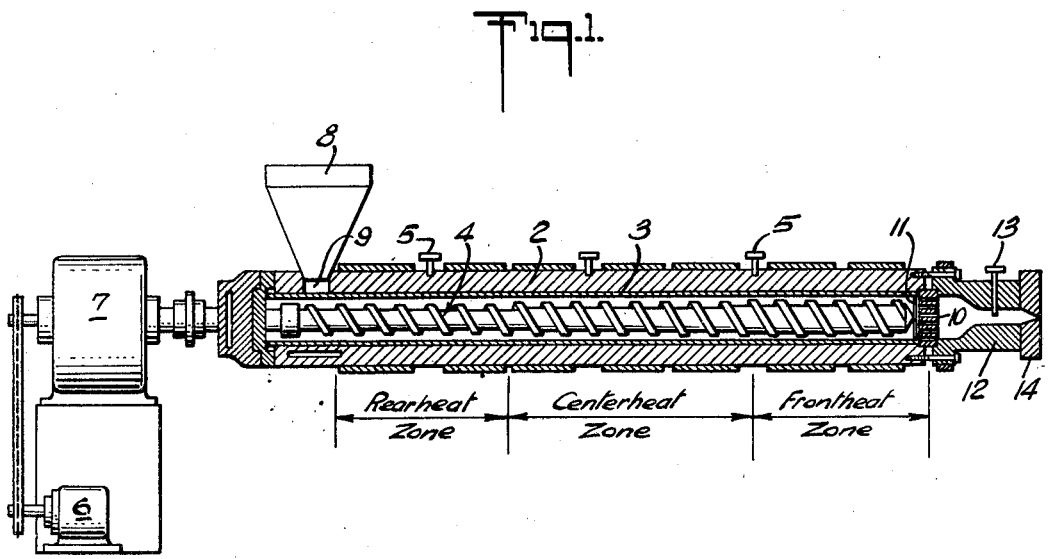
FIG. 1 is a longitudinal cross section of a typical single screw extruder.

With particular reference to FIG. 1, there is shown a cross section of a typical single screw extruder 1 which consists basically of a steel cylinder or barrel 2 (which is equipped with a hardened liner 3, i.e., usually a hard alloy) in which a solid or cored screw 4, running the entire length of the cylinder, is rotated. The barrel 2 is provided with both heating and cooling systems controlled by thermocouples 5 which are placed in wells at equal intervals along the barrel. Power for rotating the screw 4 within the barrel 2 is provided by a variable speed power source 6 through a gear reducing unit 7.

As the resin granules are fed from the hopper 8 through the feed throat 9 to the rotating screw 4, the resin granules passing through the extruder barrel 2 become fully plasticized and the plasticized mass is forced through a breaker plate 10, (which may also be used to support a screen pack 11) into a heated adapter 12, (whose temperature is controlled by a melt thermocouple 13) and through a die 14. The screw 4 functions primarily to (a) produce a fully plasticized thermally homogeneous melt, (b) provide the driving force to make the material flow through the die 14, and (c) to maintain a uniform flow rate of the plasticized material through the die 14.

As is shown in FIG. 1, the extruder is zoned according to the rear heat zone where the resin is fed into the longitudinal chamber of the barrel 2 to contact the screw and be heated to a suitable temperature while the plasticization process begins to take place. Succeeding zones, i.e., the center heat zone and the front heat zone, bring the temperature of the resinous material to one suitable to provide a thoroughly plasticized material suitable for extrusion through the die 14.

Figure 2:
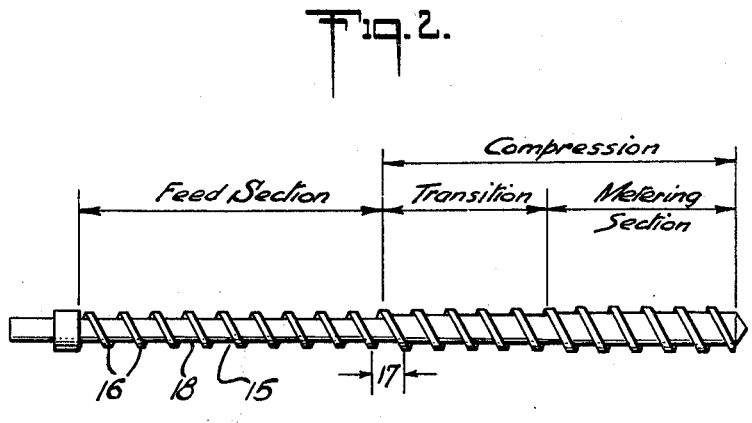
FIG. 2 is an enlarged longitudinal cross section of the screw of FIG. 1.

FIG. 2 depicts an enlarged cross section of a typical extruder screw. This is a constant pitch, gradual transition metering screw. It is divided into three sections, i.e. the feed section, the transition section and the metering section. The screw has a continuous helical channel 15 cut into it and this channel 15 usually extends the entire length of the screw from the feed throat 9 of the extruder barrel 2 to the forward end of the screw. The helical ridge of metal left when mechining the screw channel in the metal blank is the screw flight 16 and the exposed flat surface of each flight 16, i.e. the flat surface of each flight closest to the inner surface of the barrel, is the land 18. The distance between flights, or the lead 17, is usually equal to the outer diameter of the screw. Normally the screw flight diameter is the same as the inner diameter of the longitudinal cylindrical chamber of the barrel 2 minus a carefully specified clearance.

In this constant pitch gradual transition metering screw, channel depth is greatest in the feed section and is constant until it smoothly decreases through the transition section to the constant depth in the metering section. There are other transitions applicable whereby there is a rapid transition of channel depth, i.e., transition can be broadly varied.

Channel depth in the feed section of the screw will vary depending on the size of the screw and commercial practice, however, the art recognized maximum clearance between the screw, i.e., the flight-lands of the screw, and the inner surface of the extruder barrel, i.e., the cylinder wall is 0.005 inch. The instant invention increases this clearance by at least 10% in the compression section of the screw and preferably only in the metering section of the screw.

Extruder screws for typical single screw extruders are as stated constructed according to certain sections. These sections of the screw vary but as a general rule the metering section defines from about ¼ to about ½ of the total length of the screw, the transition section defines from about 1/24 to about ¼ of this length while the feed section defines the remainder of the screw length. For example, in a typical screw having a 24:1 L/D, the feed section would normally extend from about 6 to about 12 flights, the transition section would extend from about 1 to 6 flights and the metering section would extend from 6 to 12 flights. The nominal compression ratio of an extruder screw generally defines the ratio of the channel depth of the feed section to the channel depth of the metering section. This ratio is generally from about 3:1 to about 4.5:1; however, in some instances compression ratios as low as 1.1:1 may be used where both good mixing of the resin and good quality resin are not desired. The higher compression ratio is utilized where more thorough mixing and a greater pressure build up in the extruder are both desired.

Additionally, the clearance between the screw flights and the wall of the cylinder of the extruder barrel can not exceed an accepted maximum without experiencing a reduced flow rate because the plasticized extrudate exhibits a tendency to flow back along the space provided between the screw and the inner wall of the barrel cylinder when the clearance exceeds this maximum which is normally 0.005 inch. A radial clearance of no greater than 0.005 inch is the usual stated absolute maximum.

The instant invention is concerned with the metering section or compression sections of the extruder screw and primarily with the diameter of the screw flights in this section. This invention provides a clearance between the surface of each of these flights in the compression section and the walls of the cylinder of the barrel of at least 10% greater than the clearance in effect between the flights of the screw in the feed section and the walls of the cylinder there, while maintaining practical and needed clearances in the feed section. This is accomplished by either reducing the diameter of each of the screw flights in the metering or compression section or both, or by increasing the diameter of the cylinder of the extruder immediately adjacent to one or both of these sections of the screw. The depth of the channel in any section of the screw is not disturbed. The reduction in the diameter of the flights in the compression section or in the metering section alone, if the latter is the case, can be accomplished by a gradual decrease in diameter there; it can increase, decrease, be made concoidal, etc., provided that the overall effect is at least a 10% increase in the clearance between the flight-lands of the screw in the compression section, or in the metering section alone, and the adjacent wall of the extruder cylinder, as compared to the clearance between the flight-lands and the cylinder wall in the feed section.

With reference to FIG. 3 which provides a cross section (cutaway) primarily of the metering section of an extruder screw 4, note that the clearance between the cylinder wall 3 of the extruder barrel 2 and each of the flights 16 defining the metering section of the screw is visually greater than the clearance shown between that same cylinder wall 3 and the flights 16 of the screw 4 in the feed section. The terminal end of the screw 4, i.e., the last helical revolution 19 or the last revolution of the flight, is machined to bear the clearance of the feed section and not of the undercut or increased clearance portion of the screw in the metering section. This is to insure that the screw 4 is centered in the barrel 2 and that the screw will not wobble in the barrel with detrimental effects to the extrusion of the plastic material.

The same effect is provided, as is depicted in FIG. 4, by undercutting 20 the cylinder wall, i.e., the hard liner 3 representing the cylinder wall of the barrel 2, an amount sufficient to provide a clearance between its wall surface and the surface of each of the flights in the metering section of the screw of between about 0.01 and 0.006 inch more than that of the feed section.

Note once again that means to insure the centering of the screw 4 in the barrel 2 and thus deter wobbling, is provided in this instance by establishing a clearance adjacent the last, or terminal, helical flight 19 of the screw 4 and the cylinder wall 3 of the barrel 2 which is equal to the clearance provided in the feed section. This is accomplished by leaving free from the undercut 20 in the barrel 2, the shoulder 21 of the barrel 2 which is adjacent the last helical flight 19.

What is claimed is:

1. In a single screw extruder consisting basically of a cylinder in which a screw extending substantially the entire length of the cylinder is rotated, said cylinder comprising a feed section and a compression section, the improvement which comprises a flight-land clearance between the inner wall of the cylinder and the flights of the screw in the compression section of at least 10% in excess of the flight-land clearance in the Feed Section of the screw, said compression section comprising a transition section and a metering section, all of said sections being circular in cross-section and concentric with respect to each other and to said screw; and means to center the screw in the cylinder and thus significantly reduce damaging shear to thermally sensitive plastic material undergoing extrusion without significantly changing the screw feed rate.

2. The improvement in a single screw extruder as defined in claim 1 wherein said flight-land clearance in the compression section is from about 0.01 to about 0.006 inch.

3. The improvement of claim 1 wherein said clearance of at least 10% in excess of the clearance in the feed section, is in the metering section.

4. The improvement in a single screw extruder as defined in claim 1, wherein the flight-land clearance in the compression section is increased by reducing the diameter of the screw flight-lands.

5. The improvement in a single screw extruder as defined in claim 1, wherein the flight-land clearance in the compression section is increased by increasing the diameter of the inner wall of the cylinder in the compression section.

6. The improvement in a single screw extruder as defined in claim 1, wherein said screw has a constant pitch.

7. The improvement in a single screw extruder as defined in claim 1, wherein said screw has a continuous helical channel therein, the depth of which is greatest in said feed section, decreases in said transition section, and is smallest in said metering section.

8. The improvement in a single screw extruder as defined in claim 7, wherein the depth of said continuous helical channel is constant in said feed section and in said metering section.

References Cited

UNITED STATES PATENTS

| | | |
|---|---|---|
| 2,653,349 | 9/1953 | Elgin et al. |
| 2,752,633 | 7/1956 | Wertzel. |
| 2,770,837 | 11/1956 | Reyenhauser. |
| 3,197,814 | 8/1965 | Bond et al. |
| 3,295,160 | 1/1967 | Schippers. |
| 3,304,580 | 2/1967 | Fochlen. |

WILLIAM J. STEPHENSON, Primary Examiner